United States Patent Office 3,448,408
Patented June 3, 1969

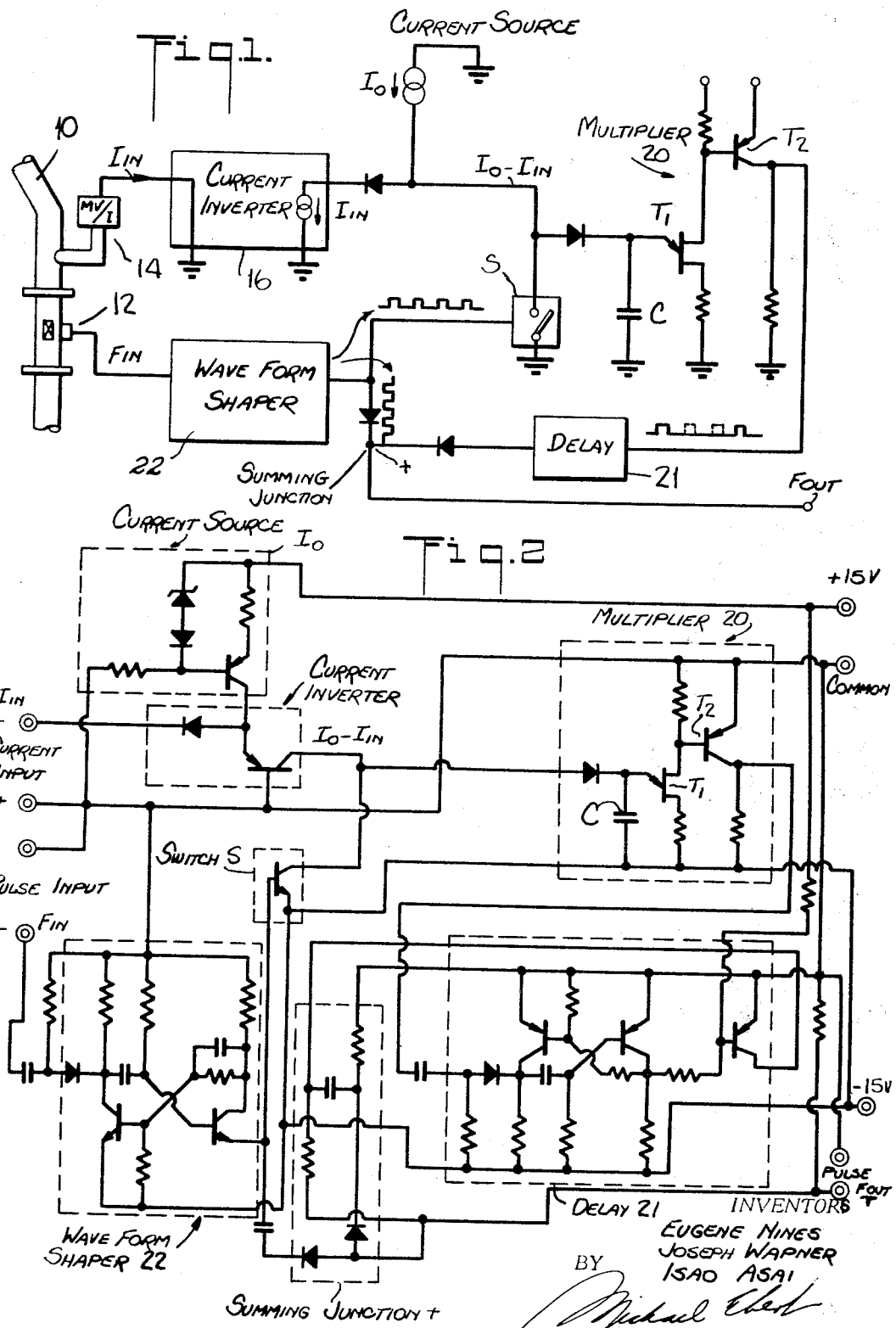

3,448,408
FREQUENCY MODIFICATION OF PULSE TRAIN AS A FUNCTION OF AN ANALOG SIGNAL
Joseph Wapner and Eugene Nines, Levittown, and Isao Asai, Hatboro, Pa., assignors to Fischer & Parter Co., Warminster, Pa., a corporation of Pennsylvania
Filed Mar. 22, 1966, Ser. No. 536,431
Int. Cl. H03k 7/10
U.S. Cl. 332—9                                    11 Claims

ABSTRACT OF THE DISCLOSURE

A technique for modifying the frequency of a pulse train whose frequency represents a first variable, such as flow rate, as a function of an analog signal representing a second variable such as temperature. The technique involves dividing the pulse train by N, where the numerical value of N is a function of the analog signal, the resultant divided train being interleaved with the original train to produce an output train whose frequency depends on both variables.

---

This invention relates to information-bearing pulse trains, the frequency or number of pulses of which is related to a measured variable. In particular, the invention contemplates the modification of such a pulse train by an analog signal representing a second variable.

Pulse trains of the foregoing type are generally presented by transducers of the tachometer or turbine meter type and may also be displayed by photocells, star wheels, etc. It is often found desirable, if not necessary, to modify such pulse trains to reflect a second variable generated in the form of an analog signal. Conventional examples of this type of modification include the use of a pulse duration modulating transmitter-type signal which interrupts the pulse train as a ratio of the ON to the OFF time of the analog signal. This ON-OF type of operation, however, creates a discontinuity in the information rate; a feature which is highly undesirable when the signal is to be utilized for control purposes or for transient analysis. Thus, where it is desired to correct a flow signal, given on the basis of a volume measurement and as a function of the temperature of the fluid, and to utilize the resultant signal to continuously control a flow regulating value, conventional type apparatus which supply a discontinuous modified signal are unsatisfactory.

Accordingly, it is the object of this invention to provide a method and apparatus for modifying pulse train data on a continuous basis in response to and dependent upon an analog signal.

It is a further object of this invention to generate an essentially continuous pulse train of information that is a function of a measured variable multiplied by a compensating signal in the form of an analog signal.

And it is still another object of this invention to compensate a fluid flow signal in pulse train form as a function of temperature without introducing discontinuities in the train.

Briefly, the invention is predicated upon the concept of leading the information-bearing-pulse-train over two paths which are later interleaved by pulse adder type circuitry, for example, an OR gate. The first of such paths leads directly to the OR gate, while the second passes through a pulse divider circuit whose division rate or value depends upon the analog modification signal. Division is effected by employing the signal from the pulse train to redundantly trigger a quantizing circuit, the quantity of charge from which is analog-signal related. An integrating element stores the charge and fires a semiconductor element whenever N chargs have been received; N therefore being the rate of division vis-a-vis the original pulse train. Consequently, the division rate is related to the analog signal, and whenever a pulse is received from the first train, this pulse in effect is multiplied by 1/N and stored in what is in effect a temporary memory device until N pulses have been received. The Nth pulse creates a product of N/N or 1, and generates an output pulse which, by suitable circuitry, is appropriately staggered in time (such that it is not coincident with any pulse in the first train), and is applied to the second input of the OR gate. The output of the OR gate is now a pulse train of a frequency $F1+F_{1/N'}$ where $F_1$ is a function of, for example, the flow rate, and N is a function of the temperature of the flowing fluid.

The above mentioned and other features and objects of this invention and the manner of attaining them will become more apparent and the invention itself will best be understood by reference to the following decription of an embodiment of the invention taken in conjunction with the accompanying drawings wherein:

FIG. 1, illustrates in block schematic form a circuit embodying the inventive concept; and
FIG. 2 shows schematic details of the various blocks shown in FIG. 1.

Turning now to the invention, and in particular to FIG. 1, there may be seen a fluid conduit 10 having a turbine meter 12 mounted therein. The pulse frequency $F_{in}$ emanating from this meter represents the fluid flow in pulse train form, while the fluid's temperature is sensed by the thermocouple 14, whose output is denoted by $I_{in}$.

To achieve the functional result desired where the flow rate is modified to reflect the temperature of the medium flowing in the conduit 10, it is necessary for an inverse dependability to be formed from the thermocouple output. That is, since as the temperature increases the density of the flowing fluid decreases, it is necessary to reverse the effect of an increasing thermocouple output upon the circuit. Needless to say, such an inversion may or may not be required with other applications of the inventive arrangement as will be apparent to those skilled in the art. Accordingly, current inverter 16 is provided which, in conjunction with the current $I_O$, forms the sum $I_O-I_{N'}$ which sum is made available for quantization by the multiplier circuit 20 and switch S, whose operation will be explained shortly.

The input pulse in $F_{in}$ is led to a waveform shaper 22 where the signal is amplified and shaped so that it may operate switch S. Switch S, which is a schematic representation only and may, for example, be a switching transistor, is actuated to open upon each input pulse, thereby chopping the current $I_O-I_{in}$. Accordingly, the signal from the pulse train $F_{in}$ is utilized to trigger a quantizing type circuit which creates a discrete quantity of charge, whose value is indirectly proportional to the magnitude of the analog signal $I_{in}$ and directly proportional to $I_O-I_{in}$. This charge is stored by a relatively large integrating capacitor C. The integrating capacitor is connected to the emitter of unijunction transistor $T_1$ (a double base diode where the junction acts simultaneously as an emitter and collector). When N quanta of charges have been received, the voltage of the capacitor will have risen to the firing point of the unijunction. Upon firing, transistor $T_1$ and then transistor $T_2$ become conductive, quickly discharging capacitor C and resetting the cycle. At this juncture it bears mentioning that circuit 20 has been designated as a multiplier circuit because it effectively multiplies the pulse train input by a factor of 1/N.

The output from transistor $T_2$ triggers the delay circuit 21 which interpolates the pulse between the original input pulses of the train $F_{in}$ to ensure that the firing of the unijunction does not result in a pulse lap which would otherwise occur if the pulses were to appear simultaneously at the summing junction.

The described arrangement acts continuously and redundantly, each additional quanta of charge again serving to raise the voltage level on the capacitor to a point where the unijunction will fire and discharge capacitor C. If the quanta is precisely controlled, it will always take precisely N pulses to raise the level of voltage to the firing point for the same analog signal.

A theoretical analysis of the foregoing may be realized by considering that the quanta of charge being placed upon the capacitor may be represented by an area of volts X time. Since the time interval can be fixed quite accurately (pulse duration) the area is essentially a function of volts only. Thus the analog signal, when converted into a voltage form, is the variable which controls the exact number of quanta required to raise the voltage to the firing level. Consequently, as the current $I_{in}$ increases, the sum $I_0 - I_{in}$ decreases, requiring a greater N to discharge capacitor C and therefore interleaving a smaller number of pulses. A decrease in $I_{in}$ on the other hand, will increase the sum $I_0 - I_{in}$ and decrease N; increasing the number of interleaved pulses and thereby increasing $F_{out}$ which may be expressed as $F_{in} + F_{in/N'}$ where N is the decribed function of the analog signal.

From the foregoing, it will be apparent that a second form of division circuitry may easily be derived, in accordance with the invention, whereby the quanta of charge in the pulses is controlled from two separate sources. In this latter embodiment the above described time portion of a quanta area would also be an analog variable and the division rate would therefore also be dependent on this signal. Thus, since the voltage would be dependent upon another variable, two simultaneous variations from two signals could be employed to trigger the pulses to be interleaved. A further advantage of this circuit would be that if two analog inputs were tied together such that they are controlled from one signal, the result would be a square term and a division by $N_2$ would result. This function closely approximates the straight line segment of a $1 + 1/N$ type curve.

FIG. 2, is an expanded illustration of the block diagram of FIG. 1. Since each of the boxes bracketed by dashed lines is well known to those skilled in the art, they will not be explained in detail. Suffice to say, as explained previously, the current source and inverter combine to issue a signal $1_0 - 1_{in}$ which is applied to a quantizing switch S controlled by pulse train $F_{in}$. Train $F_{in}$ has been previously applied to a one-shot multivibrator 22 which acts as a waveform shaper. The output from switch S is utilized to charge an integrating capacitor C firing unijunction transistor $T_1$ and hence transistor $T_2$ when N quanta of charge have been received. The output from multiplier 20 is led to delay circuit 21, also a one-shot multivibrator for interpolating at the summing junction the pulses to be interleaved into the original pulse train emanating from the waveform shaper.

In the foregoing description, little has been said as to the practical utilization of the final train, $F_{out}$, in the described embodiment. This train, for example, may be employed to alter ratios of products, such as would normally be encountered in blending or mixing operations.

While the principles of the invention have been described in connection with specific apparatus, it is to be clearly understood that this description is made only by way of example and not as a limitation to the scope of the invention as set forth in the objects thereof and in the accompanying claims. For example, while the quantizing arrangement shown depicts the utilization of a capacitor in conjunction with a unijunction transistor, it is also possible to use other quantizing devices such as square loop magnetic cores which can generate a discrete quanta of charge and also divide by a predetermined number of quanta.

We claim:
1. The method of modifying a pulse train with an analog signal comprising the steps of:
dividing the pulse train by N where the numerical value of N is a function of the analog signal; and
interleaving the divided and the original pulse trains.
2. The method described in claim 1 wherein the division is effected by:
quantizing the analog signal with the pulse train;
integrating the quantized signal;
and forming a pulse when the integrated signal reaches a predetermined value.
3. The method described in claim 2, where the interleaving includes delaying the divided train.
4. The method described in claim 1 where the analog signal is temperature dependent, the pulse train is flow rate dependent and wherein said method further includes the step of inverting said analog signal.
5. An analog pulse train modifier comprising:
means for dividing a pulse train by N where the numerical value of N is a function of an analog signal; and
means coupled to said dividing means for interleaving said divided and original pulse trains.
6. The analog pulse train modifier claimed in claim 5 in which said interleaving means comprises a delay circuit and a summing junction, said summing junction being coupled to said pulse train source, and to said dividing means through said delay circuit.
7. The analog pulse train modifier claimed in claim 6, wherein said delay means comprises a one-shot multivibrator.
8. The analog pulse train modifier claimed in claim 5 in which said dividing means comprises:
means for quantizing the analog signal in response to pulse train pulses;
means for integrating said quantized signal; and
means for forming a pulse when said integration reaches a predetermined value and resetting said integrating means.
9. The analog pulse train modifier claimed in claim 8 in which said quantizing means comprises a pulse train controlled switch and said integrating means comprises a capacitor.
10. An apparatus for modifying a fluid flow rate signal represented as a pulse train by an analog signal dependent upon the temperature of said fluid comprising:
means for quantizing the analog signal in response to pulse train pulses;
means for integrating said quantized signal; and
means for forming a pulse when said integration reaches a predetermined value, and resetting said integrating means, and
means coupled to said pulse forming means and the source of said pulse train for the interleaving the respective output pulses thereof.
11. The apparatus claimed in claim 10 wherein said analog signal is inversely dependent upon temperature and said apparatus comprises input means responsive to a signal directly dependent upon temperature for producing an analog signal inversely dependent upon temperature.

References Cited

UNITED STATES PATENTS

| | | | |
|---|---|---|---|
| 2,605,361 | 7/1952 | Cutler | 328—14 X |
| 2,927,962 | 3/1960 | Cutler | 332—9 X |
| 3,198,961 | 8/1965 | Millsap | 307—271 X |
| 3,315,181 | 4/1967 | Rosenthal | 332—9 |
| 3,315,524 | 4/1967 | Duffy et al. | 328—59 |

ALFRED L. BRADY, *Primary Examiner*.

U.S. Cl. X.R.

73—204; 222—54; 307—271; 328—3, 14, 59, 140; 332—4